(12) United States Patent
Baumgartner et al.

(10) Patent No.: US 7,121,376 B2
(45) Date of Patent: Oct. 17, 2006

(54) DEVICE FOR THE CONTROL OF AN ACTIVE ELEMENT OF AN OCCUPANT RETENTION SYSTEM IN A VEHICLE

(75) Inventors: Walter Baumgartner, Woerth/Donau (DE); Norbert Brauner, Steinach (DE); Albrecht Foell, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/297,305

(22) PCT Filed: May 14, 2001

(86) PCT No.: PCT/DE01/01827

§ 371 (c)(1),
(2), (4) Date: Sep. 29, 2003

(87) PCT Pub. No.: WO01/94158

PCT Pub. Date: Dec. 13, 2001

(65) Prior Publication Data

US 2004/0045760 A1 Mar. 11, 2004

(30) Foreign Application Priority Data

Jun. 5, 2000 (DE) .............................. 100 27 825

(51) Int. Cl.
*B60K 28/12* (2006.01)
(52) U.S. Cl. .................... 180/282; 280/735; 701/45
(58) Field of Classification Search ............. 280/735; 180/271, 282; 701/45; 307/10.1
See application file for complete search history.

(56) References Cited

U.S. PATENT DOCUMENTS

| 5,176,214 | A | * | 1/1993 | Taufer et al. ............... 180/268 |
| 5,612,623 | A | * | 3/1997 | Watanabe et al. ........... 324/549 |
| 5,805,058 | A | * | 9/1998 | Saito et al. ................. 340/436 |
| 5,861,681 | A | * | 1/1999 | Nakano et al. ............ 307/10.1 |
| 5,892,435 | A | * | 4/1999 | Buchheim et al. .......... 340/438 |
| 5,903,062 | A | * | 5/1999 | Mattes et al. .............. 307/10.1 |
| 6,147,417 | A | * | 11/2000 | Ueno ........................ 307/10.1 |
| 6,216,070 | B1 | * | 4/2001 | Hayashi et al. ............... 701/45 |
| 6,426,567 | B1 | * | 7/2002 | Ugusa et al. .............. 307/10.1 |
| 6,504,264 | B1 | * | 1/2003 | Ueno et al. ................. 307/10.1 |
| 6,628,007 | B1 | * | 9/2003 | Baumgartner ............... 307/10.1 |
| 6,636,791 | B1 | * | 10/2003 | Okada ......................... 701/35 |
| 6,694,225 | B1 | * | 2/2004 | Aga et al. ...................... 701/1 |

FOREIGN PATENT DOCUMENTS

| DE | 198 43 074 A1 | 12/1999 |
| WO | WO 97/22009 | 6/1997 |
| WO | WO 97/32757 | 9/1997 |
| WO | WO 00/32445 | 6/2000 |

\* cited by examiner

OTHER PUBLICATIONS

XP-000860904: "Future trends in restraint systems electronics" by Walter K. Kosiak et al., c. Sep. 1999.

*Primary Examiner*—Paul N. Dickson
*Assistant Examiner*—Toan C. To
(74) *Attorney, Agent, or Firm*—Morrison & Foerster LLP

(57) ABSTRACT

In order to produce a safing concept, an extra-safing-sensor in the control unit (ECU) is foregone and the safing function from one of the available acceleration or turn-rate sensors (S1 to S5) is replaced. Furthermore a pre-stage is connected to the firing element (Z1, Z2), before the existing firing path, which, depending upon the sensor signals as analysed by the controller unit (1), controls a safety switch (T11), in series with the firing switches and the firing element.

12 Claims, 3 Drawing Sheets

DEVICE FOR THE CONTROL OF AN ACTIVE ELEMENT OF AN OCCUPANT RETENTION SYSTEM IN A VEHICLE

CLAIM FOR PRIORITY

This application claims priority to International Application No. PCT/DE01/01827 which was published in the German language on May 14, 2001.

TECHNICAL FIELD OF THE INVENTION

The invention relates to a device for driving an active element of an occupant restraint system of a vehicle.

BACKGROUND OF THE INVENTION

Conventional occupant restraint systems have a mechanical safing sensor incorporated in the central controller of the occupant restraint system. The previous mechanical safing sensors usually arranged in the control unit (ECU) of the restraint system are difficult to test, slow and relatively expensive.

A safing concept with a safing function in the restraint system means that an undesirable triggering of the occupant restraint system in the event of a malfunction of the impact identification unit, which has the sensors and the controller of the occupant restraint system, is prevented. To date, this has only been realized for the identification of a frontal impact or a side impact with subsequent activation of the front airbags or side airbags. To date, there has not been a reliable safing concept for the identification of a rollover with subsequent triggering of side airbags, curtains, etc.

SUMMARY OF THE INVENTION

The invention discloses an occupant restraint system with a cost-effective and reliable safing concept.

One advantage of the invention is to allow one safing sensor to be saved. To that end, the detection of a frontal impact with the aid of a safing sensor is shifted into the early crash satellite or sensor, which is preferably integrated in the front part of the vehicle, e.g. in the fender thereof and/or in the front engine compartment.

For the safing function in the identification of a side impact, the acceleration sensor in the Y direction, i.e. in the direction of the wheel axles transversely with respect to the vehicle direction, is simultaneously used as a safing sensor.

For the safing function in the identification of a rollover state, at least one of the acceleration sensors which act in the y direction and in the z direction is simultaneously used as a safing sensor.

In another embodiment, there are a plurality of participating sensors which simultaneously fulfill the function of safing sensors.

For the evaluation of the sensor signals, a control unit (ECU) with downstream, multistage safety switches, for example comprising a prestage with two transistors and a safety transistor connected downstream, is used to realize a safing concept.

A safety switch is additionally provided in the ignition path including the ignition element, the energy store and the ignition switches. Ignition of the ignition element occurs when both the ignition switch/switches and the safety switch turn on simultaneously. The safety transistor in the ignition path is driven by a prestage which enables the safety switch when a sufficiently high acceleration is present.

In still another embodiment, the prestage comprises two switches which in each case receive control signals from the controller and turn on when an impact is identified. The prestage switches are interconnected with one another in such a way that both identify input signals of the prestage switches for triggering. In the event of a malfunction of the impact identification unit, one of the two input signals of the prestage switches is not activated, so that the safety switch is not turned on and ignition of the ignition element cannot take place. Consequently, inadvertent ignition is prevented.

Through the use of the prestage switches, each sensor, for example an acceleration sensor, early crash satellite or rollover sensor, can simultaneously perform the safing function.

The prestage switches are preferably of discrete design, but can also be of integrated embodiment. The safety switch is generally of discrete embodiment.

In the event of a short circuit between the two inputs of the prestage switches, in one embodiment, a potential is produced at the inputs which is in proximity to the supply voltage or ground and thus inhibits at least one of the two prestage switches. This ensures that the safety switch turns off in the event of a short circuit between the inputs of the prestage switches. Equally, an interference effect on the two inputs of the switches does not lead to activation of the safety transistor.

In another embodiment, the evaluation of the sensor signals and the driving of the ignition path or ignition paths and of the prestage switches are carried out by a controller. The sensor signals are evaluated in the controller by an evaluation unit which uses the algorithm to take the ignition decision. Furthermore, a sensor signal is fed to a holding circuit which has different holding times depending on the function of frontal impact identification, side impact identification or rollover identification. If the evaluation unit takes the decision to ignite the ignition element, the ignition transistors are turned on with the aid of a firing routine. Furthermore, the ignition decision is fed in logically combined with the output of the holding element and the prestage switches. The ignition pellet can be ignited if the impact identification unit, including the sensors and the airbag control unit, for example, and also the safing function identify an impact.

In yet another embodiment, the controller is subdivided into two mutually separate units: into a main control unit and a safety control unit. The main control unit evaluates the sensor signals and drives the ignition switches. The safety control unit evaluates the sensor signals and drives the prestage switches. The hardware separation makes it possible to absorb software or hardware faults in the control unit through two independent, redundant units preferably designed as microcontrollers. This is advantageous because increasingly all functions may be integrated into the controller and the functions are thus mapped in terms of software. The controller is also referred to as control unit hereinafter.

In another embodiment, the prestage switches are designed as discrete transistors in order to increase the inherent safety, but can also be integrated. The safety transistor is of discrete construction. The ignition transistor/transistors are preferably arranged on an ASIC module, but can also be of discrete construction. The multistage concept of separately constructed modules—the controller, the prestage switches of discrete construction and the ASIC module separate therefrom—ensures a high inherent safety and fault protection of the entire system, so that faulty triggering can be reliably avoided.

BRIEF DESCRIPTION OF THE DRAWINGS

The invention is explained with reference to the drawings, in which.

Elements having the same function and the same construction are designated by the same reference symbols in FIGS. 1, 2 and 3.

DETAILED DESCRIPTION OF THE INVENTION

Figure 1:
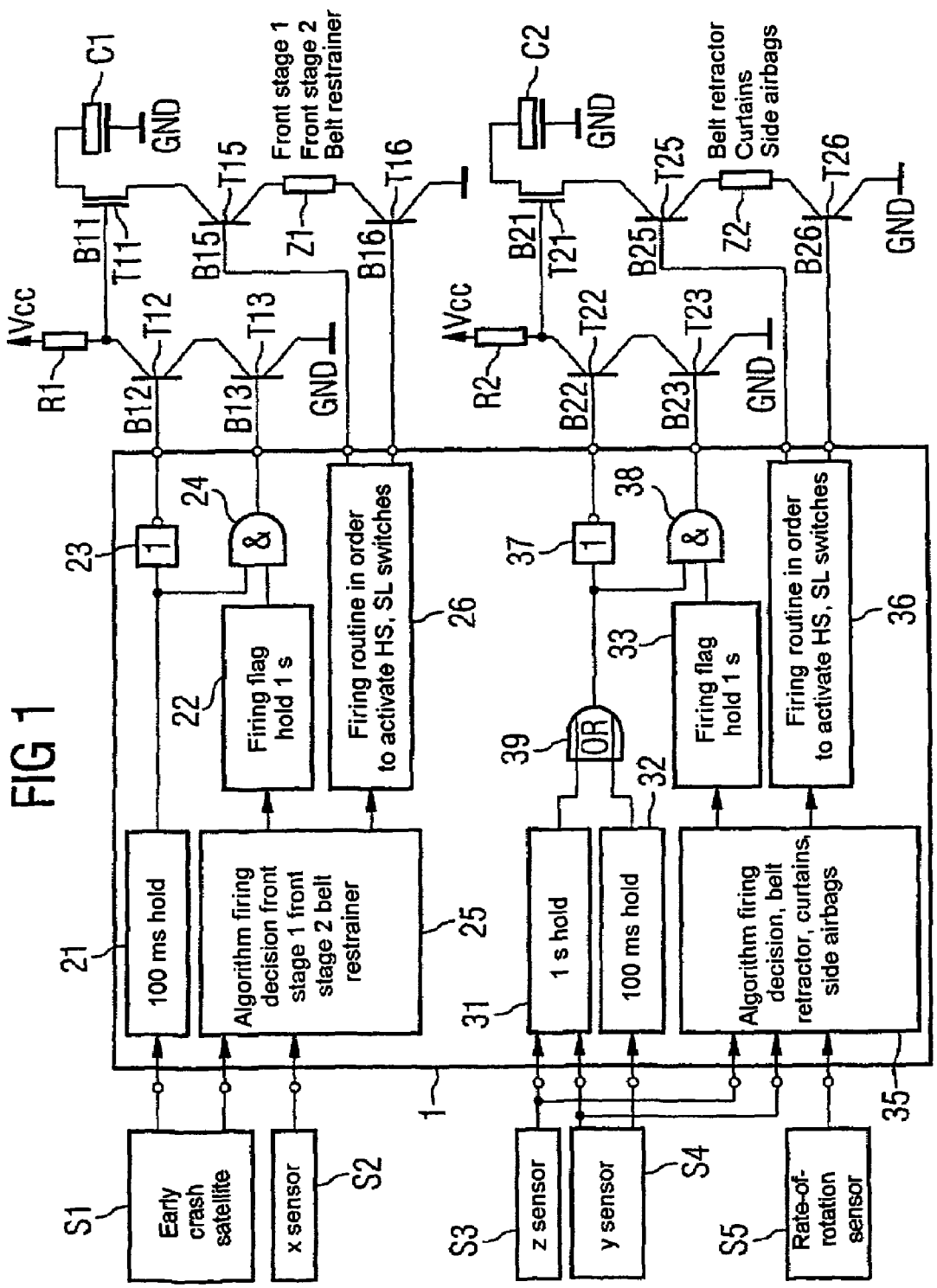
FIG. 1 shows a drive circuit with a first safing concept.

FIG. 1 shows a drive arrangement for an active element, designed as ignition elements Z1, Z2, for example, in which a controller 1 controls ignition parts with an active element depending on sensor signals. Furthermore, control unit 1 controls prestages R1, T12, T13 and R2, T22, T23, thereby ensuring that the active element Z1, Z2 can be activated or ignited when both the impact identification unit and the safing function have identified a sufficiently high acceleration.

FIG. 1 shows a plurality of sensors S1 to S5, whose sensor signals are fed to the controller 1. The sensor 1 is designed as an early crash satellite and is arranged in the front region of the vehicle, preferably in the region of the fender. As a result, a frontal impact is detected particularly early. The early crash satellite has an acceleration sensor which preferably detects movements in the direction of travel, i.e. in the X direction.

The sensor S2 is an acceleration sensor which senses movements in the X direction, i.e. movements in the vehicle direction.

The sensor S3 is an acceleration sensor which senses movements or accelerations in the Z direction, i.e. movements of the vehicle in the vertical direction. As a result, rollover situations, in particular, are identified in conjunction with the rate-of-rotation sensor S5.

The sensor S4 is an acceleration sensor which identifies movements of the vehicle in the Y direction, i.e. movements transversely with respect to the direction of travel of the vehicle. As a result, side impact situations, in particular, are identified.

The sensor S5 is designed as a rate-of-rotation sensor which identifies an angular velocity and, derived therefrom, an angular acceleration about the longitudinal axis of the vehicle, i.e. in the X direction. As a result, in particular in interaction with the sensor S3 for the Z direction, rollover states are identified.

The controller 1 includes a first and a second evaluation unit 25, 35, which evaluates the sensor signals and take an ignition decision for the various ignition paths VCC, C1, T11, T15, Z1, T16 and VCC, C2, T21, T25, Z2, T26 according to predetermined algorithms. The active elements Z1, Z2 included in the various ignition parts represent, by way of example, ignition elements (ignition pellet, smart squib) of front airbags, ignition elements of seat belt pretensioners, ignition elements of side airbags, of airbag curtains and further conceivable retractors of further restraint means.

The first evaluation unit 25 receives the sensor signals from the early crash satellites S1 and the acceleration sensor S2 in the X direction. Depending on the temporal profile of the sensor signals, a firing decision is taken using an algorithm. Said firing decision is forwarded to a holding element 22 and a first activation unit 26, both of which are arranged in the controller 1.

The first activation unit 26 implements the firing decision and activates the two ignition switches T15, T16 connected downstream of said unit, which switches are part of the first ignition path.

The below-mentioned switches
prestage switches,
safety switches,
ignition switches, may be any desired controllable switches. They are preferably designed as bipolar transistors, field-effect transistors, MOSFET transistors or the like.

The controller 1 furthermore includes a holding unit which preferably holds a change in the signal from the early crash satellite S1 for a predetermined time duration. This time duration preferably lasts about 100 ms. The holding unit bears the reference symbol 21. The output of the holding unit 21 is connected to the input B12 of the prestage switch T12 of a prestage R1, T12, T13 via an inverter 23. Furthermore, the output of the first holding unit 21 is connected to the input of an AND element 24, whose second input is connected of the second holding element 22. The output of the AND element is connected to the input B13 of the prestage switch T13 of the prestage R1, T12, T13.

The subunits arranged in the control unit 1, e.g. the evaluation units 25, 35, the holding units 21, 22, 31, 32, 33, etc., designate functional subunits which can be mapped in hardware in the control unit 1 and/or be realized by software operations.

The prestage R1, T12, T13 has two prestage switches T12, T13, whose activation branches are connected in series. One end of the activation branch of the second prestage switch T13 is connected to ground and the other end thereof is connected to one activation branch of the prestage transistor T12. The other end of the activation branch of the prestage transistor T12 is connected to the supply voltage VCC via a resistor R1. The node between the resistor R1 and the first prestage switch T12 is connected to the input B11 of the first safety transistor T11, which is part of the first ignition path C1, T11, T15, Z1, T16. The first ignition path is designed as a series circuit comprising the first energy store, the activation branch of the first safety switch T11, the activation branch of the first ignition switch T15, the active element Z1 and the activation branch of the second ignition switch T16. The first energy store C1 has a predetermined energy which suffices to ignite the active element, preferably an ignition element of a restraint means. In this case, multiple ignitions of an active element or a plurality of active elements Z1 can be triggered depending on the firing routine of the first activation unit 26. The circuit required for charging the first energy store C1 is not depicted, in order to simplify the illustration.

The ignition switches T15, T16 and the safety switch T11 are preferably arranged on an ASIC module. The prestage transistors T12 and T13 are preferably of discrete design in order to increase the inherent safety of the system.

The series circuit of the two ignition switches T15, T16 and the first safety switch T11 ensures that the active element Z1 turns on when all three switches T11, T15, T16 are turned on (ANDing).

The inherent safety of the system is additionally increased by virtue of the fact that the safety switch T11 is driven by the prestage R1, T12, T13. By way of example, if the first safety transistor T11 is a p-channel MOSFET transistor, then it turns on if both prestage switches T12 and T13 are in the on state. If just one of the prestage transistors T12, T13 is not turned on, then the potential of the input B11 of the first safety transistor T11 will assume the potential of the supply voltage VCC via the resistor R1, as a result of which the first safety transistor turns off.

This results in an additional redundancy in the system for the purpose of increasing the reliability with regard to inadvertent ignition.

The first and second prestage transistors T12, T13 are designed for example as a pnp or npn transistor, respectively.

If a short circuit occurs for example between the inputs and B12 and B13 of the prestage switches T12, T13, then the outputs of the control unit 1 are designed such that the potential is in proximity either to ground GND or to the supply voltage VCC, so that at least one of the two prestage switches T12, T13 turns off and, consequently, the first safety switch T11 is turned off.

If both acceleration sensors S1, S2 are functioning, then all the switches T12, T13, T11, T15 and T16 are turned off in the non-triggering situation, so that the active element Z1 is not triggered.

If a front impact takes place with the sensors S1, S2 functioning, then the early crash satellite S1 reports the impact to the control unit 1 somewhat earlier than the acceleration sensor in the X direction S2, since the early crash satellite S1 is accommodated in the front part of the vehicle or, for rear impact identification, in the rear part of the vehicle. The temporal offset of the sensor signals is 50 ms, by way of example. The first evaluation unit 25 identifies impact and activates the firing flag in the second holding unit 22 and activates the ignition routine in the first activation unit, as a result of which the two ignition switches T15 and T16 are turned on. The early crash satellite S1 simultaneously serves as a safing sensor located at the input of the impact identification unit responsible for the safing function.

In the event of a defective sensor, a defective evaluation unit 25, a defective activation unit 26 or a defective ignition switch T1, T16, will prevent the active element Z1 from triggering.

In the event of a front impact with the early crash satellite S1 functioning, the sensor signal is conducted to a holding unit 21, which provides an activation signal for a predetermined duration at its output. For the predetermined time duration (100 ms) the prestage transistor T12 is driven and turned on via the inverter 23. The second prestage switch T13 is likewise turned on if the activation signals of the first holding unit 21 and of the second holding unit 22 produce, via the AND gate 24, an enable signal, which is HIGH level in the present case.

The two holding units 21, 22 are preferably edge-controlled, i.e. an activation signal is output for a predetermined duration in the event of a predetermined and defined change in the respective input signals. In a further embodiment, the holding unit 21, 22 is triggered as soon as a respective predetermined threshold is exceeded. By way of example, if a defect occurs in the early crash sensor, then, directly after the system has been switched on, the output of the holding unit 21 becomes active for a predetermined time duration. After this time duration, the output is inactive (not ENABLE). Since the second holding unit 22 has a deactivated output in this time duration (not enable), the second prestage transistor T13 is not turned on. Although the first prestage transistor T12 was activated for a predetermined time duration, in this case by a LOW level signal, the first safety switch T11 remains turned off.

In the event of an impact, the defective early crash satellite S1 does not change its state such that the first holding unit 21 is activated at its output. If the acceleration sensor S2 in the X direction in conjunction with the first evaluation unit 25 now identifies the impact, although the two ignition transistors T15 and T16 are activated by means of the firing routine in the first activation unit 26, it is nevertheless the case that the prestage switches T12, T13 remain turned off, since the first holding unit 21 is not active at its output. Consequently, the first safety switch T11 is in the off state, as a result of which no current can flow through the first ignition path and the active element Z1 is not triggered.

The prestage switches T12 and T13 both turn on when the activation signals at the outputs of the first and second holding units 21, 22 are active in a predetermined time window. The time window is about 50 ms in the exemplary embodiment.

If the acceleration sensor S2 in the X direction is partly defective, and/or the firing decision in the first evaluation unit 25 is incorrect, then although the two ignition switches T15 and T16 may be activated by means of the firing routine, it is unlikely that the firing decision of the first evaluation unit 25 will occur at the right time in the predetermined time window to turn on both prestage switches T12, T13. The holding element 21 is not activated in this case, so that the transistor T11 is not closed and, consequently, the ignition element Z1 is not triggered.

The result is a drive arrangement for frontal crash identification with high inherent safety.

The lower part of FIG. 1 illustrates a second ignition path C2, T21, T25, Z2, T26 and a second prestage R2, T22, T23, which correspond to the first ignition path and the first prestage in terms of their construction and function. Furthermore, a second evaluation unit 35 is arranged in the controller, the sensor signals from the sensors S3, S4, S5 being fed to the unit. The second evaluation unit 35 comprises an algorithm which takes a firing decision for the active element Z2 depending on the input signals of the sensors. The firing decision is forwarded to a second activation unit 36 and a fifth holding unit 33, which has a holding time of preferably about 1 second. The second activation unit 36 conditions the firing decision and forwards corresponding signals to the ignition switch T25, T26. The acceleration sensors S3 and S4 which effect detection in the z and y directions act on a third holding unit 31, which preferably has a holding duration of about 1 second.

The sensor signals of the acceleration sensor S4 are furthermore fed to a fourth holding unit 32, which is arranged in the control unit 1 and preferably has a holding duration of 100 ms.

The combination of the three sensors S3, S4, S5 make it possible for the second evaluation unit 35 to identify a side impact and a rollover in a manner dependent on the sensor signals and to activate corresponding ignition elements symbolized by the active element Z2, for example of the side airbag, of the rollover curtain or of other restraint systems.

In principle, the safing concept functions like the concept which has already been explained for the identification of a frontal impact with subsequent activation of the front airbags. In this case, the three sensors S3, S4, S5 simultaneously operate as safing sensors. For the activation of the ignition element Z2, it is necessary both for the elements connected upstream of the holding elements 31 and 32, respectively, to identify a sufficiently high acceleration and for the algorithm in the evaluation unit 35 to identify an impact or rollover. The output signals of the third and fourth holding units 31, 32 are combined with one another by means of an OR element 39. The output signal of the OR element 39 is fed via an inverter 37 to the third prestage switch 22 of the prestage and to an AND element 38, which receives the firing flag from the fifth holding unit 33 as second output. The output signal of the AND element 38 is fed to the fourth prestage switch T23.

The ANDing of the two prestage switches T22, T23 results in a time window of about 1 second in a rollover event, which time window is prescribed by the two evaluation units 31 and 33.

In the event of a side impact, the sensor S4 in the y direction is activated, so that, in this case, the time window for the activation of the two prestage switches T22, T23 and the subsequent activation of the second safety switch T21 is prescribed by the holding units 32 and 33.

The acceleration sensor S4 in the y direction outputs two different signals which serve, on the one hand, for the identification of a rollover state and, on the other hand, for the identification of a side impact. The two different sensor signals are correspondingly fed to the two holding units 31 and 32.

Figure 2:
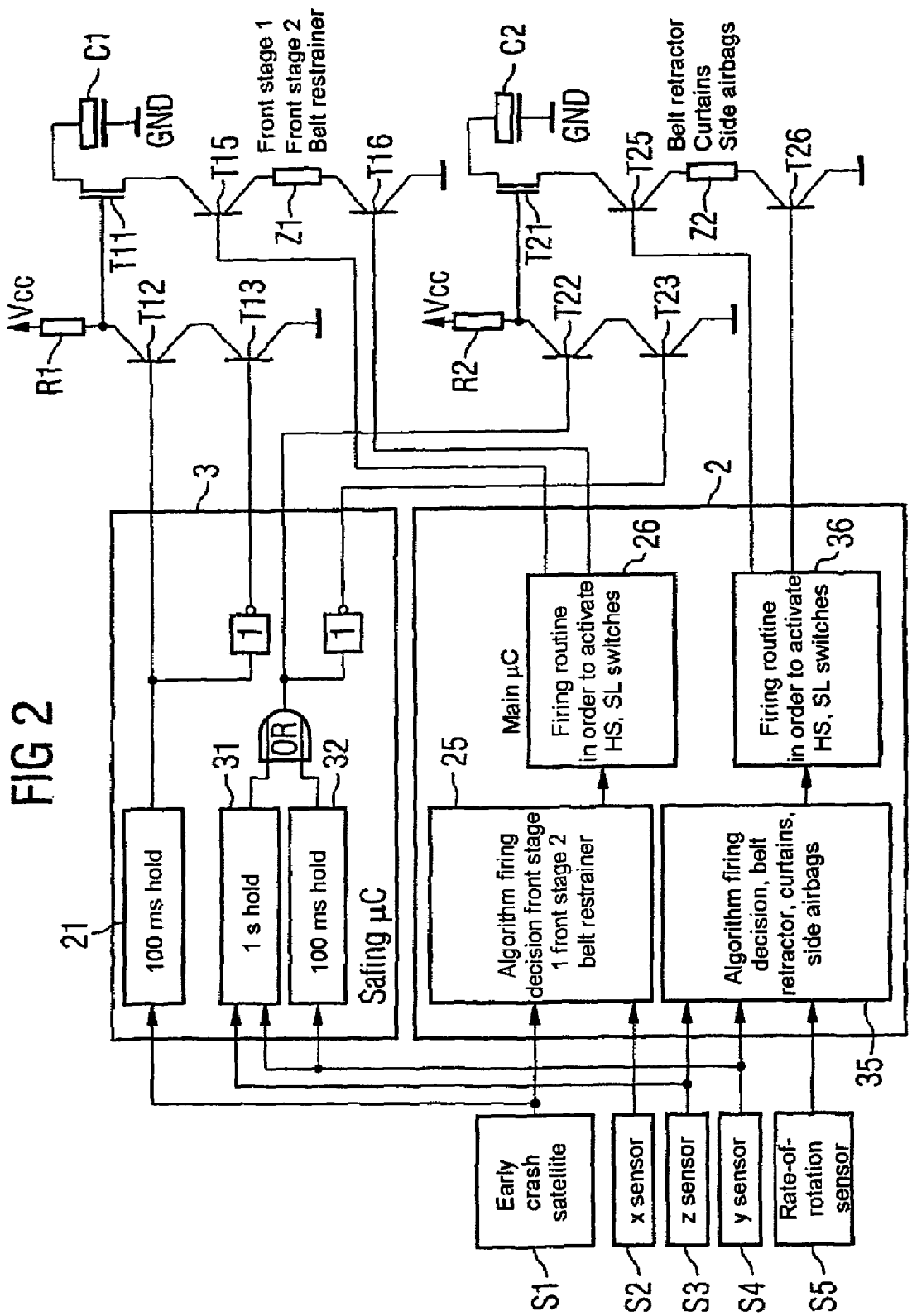
FIG. 2 shows a drive circuit with a second safing concept.

FIG. 2 shows a circuit arrangement for identifying crash situations and for triggering ignition elements which essentially corresponds to the circuit arrangement from FIG. 1.

In contrast to the circuit arrangement with regard to FIG. 1, in FIG. 2 the control unit 1 from FIG. 1 is subdivided into two subunits, the main control unit 2 and the safety control unit 3.

This subdivision, also effected in terms of hardware, increases the inherent safety of the system. The main control unit 2 includes the evaluation units 25, 35 and the activation units 26, 36. The safety control unit 3 includes the safety functions which serve for driving the prestages R1, T12, T13 and R2, T22, T23. Consequently, the safety control unit 3 contains the various holding units 21, 31, 32 and corresponding combination elements (OR, AND elements and inverters). It would be conceivable also to accommodate the holding units 22, 33 from FIG. 1 in the safety control unit 3 and to provide corresponding connections between the main control unit 2 and the safety control unit 3. The sensor signals of the acceleration and rate-of-rotation sensors S1 to S5 are in each case fed into the corresponding function blocks of the main control unit 2 and of the safety control unit 3.

The subdivision of the control unit 1 into a main control unit 2 and a safety control unit 3 creates a structure through which a defective operation of a hardware or software unit leads to non-triggering of the corresponding active units Z2, Z1.

In another embodiment, in contrast to the illustration in FIGS. 1 and 2, the resistors R1 and R2 of the two prestages are not connected to the supply voltage Vcc, but rather in each case of the first and second energy store C1, C2, respectively, which each have an ignition potential. This ensures that the safety transistor T11 or T21, designed as p-channel or pnp, reliably turns off independently of the potential difference between the supply voltage Vcc and the ignition potential of the energy store C1 or C2, respectively, given corresponding driving by the corresponding prestage.

Figure 3:
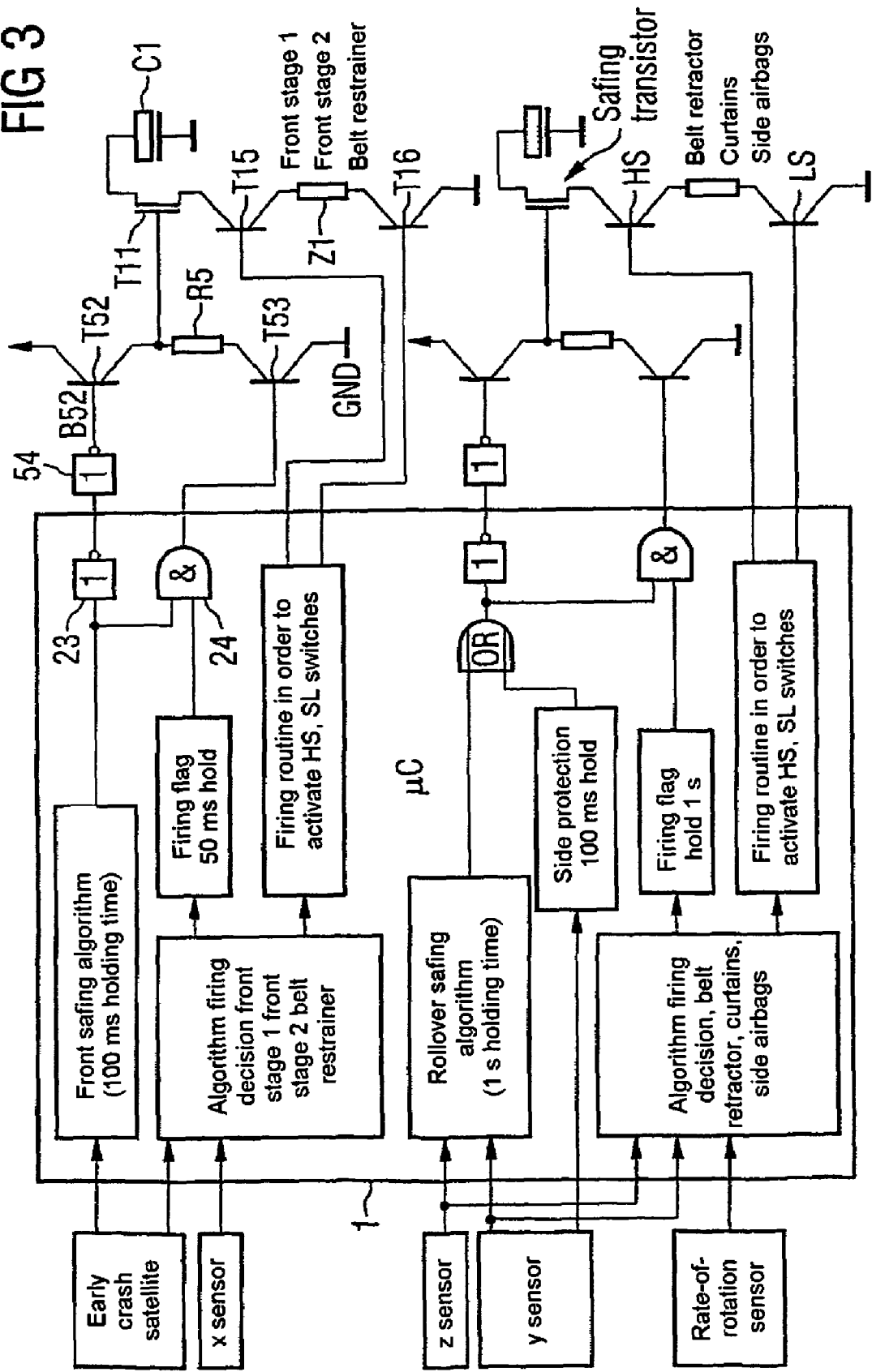
FIG. 3 shows a further drive circuit.

FIG. 3 illustrates a drive circuit which differs from FIG. 1 in that circuit in the region of the prestages R1, T12, T13 and R2, T22, T23 are embodied differently. The change are illustrated by way of example using the upper prestage R1, T12, T13.

The output of the inverter 23 is connected to a further inverter 54 via an output pin of the control unit 1. The output of the further inverter 54 is connected to the control input (base/gate) of a prestage switch T52. The output of the AND element 24 is connected to the control input (base/gate) of a further prestage switch T53 via an output pin of the control unit 1. The activation branch of the prestage switch T52 is connected, on the emitter side or source side, to the potential of the ignition capacitor C1 and, on the collector side or drain side, to the control input of the safety transistor T11 and one end of the resistor R5.

The activation branch of the prestage switch T53 is connected, on the emitter side or source side, to ground GND and, on the collector side or drain side, to the other end of the resistor R5.

The safety switch T11 turns on when the prestage switch T52 is at high resistance, i.e. its activation branch is inhibited, and the prestage switch T53 turns on. For this, the inputs of the prestage switches T52 and T53 must be switched to HIGH and, consequently, the output pins of the inverter 23 and of the AND element 24 must be switched to LOW and to HIGH, respectively. The control input of the safety switch T11 is then pulled to ground, as a result of which the safety switch T11 turns on, the latter being designed by way of example as a p-channel MOSFET transistor.

The other three possible state combinations at the input of the two prestage switches T52, T53 lead to the inhibiting of the safety transistor T11. Thus, in the event of a short circuit between the two output pins mentioned or an in-phase interference influence on the two output pins, the safety transistor T11 is always turned off.

In a further embodiment, the prestages in accordance with FIG. 2 can be replaced by the prestages illustrated in FIG. 3.

The invention claimed is:

1. A device to drive an active element of an occupant restraint system of a vehicle, comprising:
    a control unit;
    sensors having signals fed to the control unit;
    an ignition path which has an energy store, a safety switch, an active element and at least one ignition switch, controlled by the control unit; and
    a prestage which drives the safety switch and is controlled by the control unit, the prestage enabling the safety switch if at least two sensors identify a sufficient acceleration, and the prestage inhibiting the safety switch if a sensor and/or the control unit is defective, wherein
        the prestage has a plurality of prestage switches whose inputs are connected to the control unit and whose through-connection branches are connected in series,
        a resistor is connected in series with the through-connection branches, and
        a safety transistor turns on when the prestage switches are enabled by the control unit.

2. The device as claimed in claim 1, wherein one of the sensors is designed as an early crash sensor and one of the sensors is designed as an acceleration sensor with detection in the longitudinal direction.

3. The device as claimed in claim 1, wherein the prestage enables the safety switch if at least three sensors identify a sufficient acceleration.

4. The device as claimed in claim 1, wherein one of the sensors are designed as an early crash sensor, one of the sensors is designed as an acceleration sensor with detection in the vertical direction and one of the sensors is designed as an acceleration sensor with detection in the transversal direction.

5. The device as claimed in claim 1, wherein the prestage has a prestage switch, whose input is connected to the control unit and whose through-connection branch is connected to the input of the safety switch.

6. The device as claimed in claim 1, wherein the prestage comprises prestage switches of discrete construction.

7. The device as claimed in claim 5, wherein in the event of a short circuit between two inputs of the prestage switches, the resulting potential is in proximity to ground or the supply voltage such that at least one of the prestage switches turns off.

8. The device as claimed in claim 1, wherein the safety switch is inhibited when there is an in-phase interference or a short circuit between two inputs of the prestage switches.

9. The device as claimed in claim 1, wherein the control unit is subdivided into the following separate units:
 a main control unit, which drives the ignition switch/switches, and
 a safety control unit, which controls the safety switch via the prestage, the main control unit and the safety control unit preferably being designed as microcontrollers and each evaluating the signals of the sensors.

10. The device as claimed in claim 1, wherein a first sensor serving as a safing sensor and designed as an early crash sensor and/or as an acceleration sensor at least partly in the x direction.

11. The device as claimed in claim 1, wherein the control unit is designed as a microcontroller.

12. The device as claimed in claim 1, wherein the prestage switch/switches, the ignition switch/switches, the safety switch/switches are preferably designed as bipolar and/or as field-effect transistors.

* * * * *